United States Patent [19]

Rossi

[11] 4,193,386
[45] Mar. 18, 1980

[54] SPEAR GUN

[76] Inventor: Jean-Francois Rossi, RN 209 Quartier du Bouvillard, Carros, France

[21] Appl. No.: 892,062

[22] Filed: Mar. 31, 1978

[30] Foreign Application Priority Data

Apr. 1, 1977 [FR] France .................................. 77 10681

[51] Int. Cl.² .............................................. F41B 7/04
[52] U.S. Cl. ..................................... 124/22; 124/41 R
[58] Field of Search ...................... 124/22, 21, 27, 35, 124/41 R, 83, 80; 43/6; 188/82-84

[56] References Cited

U.S. PATENT DOCUMENTS

| 2,818,849 | 1/1958 | Woods | 124/22 |
| 3,006,330 | 10/1961 | De Bach | 124/22 |
| 3,340,642 | 9/1967 | Vasiljevic | 124/22 X |
| 3,741,190 | 6/1973 | Lopez | 124/22 |
| 3,750,783 | 8/1973 | Ohtsuka et al. | 188/82.84 X |
| 3,857,379 | 12/1974 | Burghardt | 124/41 R X |

Primary Examiner—William R. Browne
Attorney, Agent, or Firm—Pollock, Vande Sande & Priddy

[57] ABSTRACT

A slingshot type spear gun for underwater fishing comprises a rod, a guide for an arrow at the forward end of the rod, and a pistol grip trigger mechanism at the rear end of the rod. A sleeve slidably mounted on the rod has one end of the rubber bands used for propelling the arrow fastened thereto, one pair of cross bars extending sidewise, and a mechanism for automatically releasably locking the sleeve to the rod. In order to cock the gun, the sleeve is pulled backwardly along the rod to a position in which the yoke at the free ends of the rubber bands may be easily engaged in a notch on the arrow. Thereafter, the sleeve is shifted forwardly along the rod by the user, pushing it with the feet bearing on the cross bars, until it reaches the desired loading degree of the rubber bands. The locking mechanism will automatically lock the sleeve in the desired position, against the action of the rubber bands.

3 Claims, 5 Drawing Figures

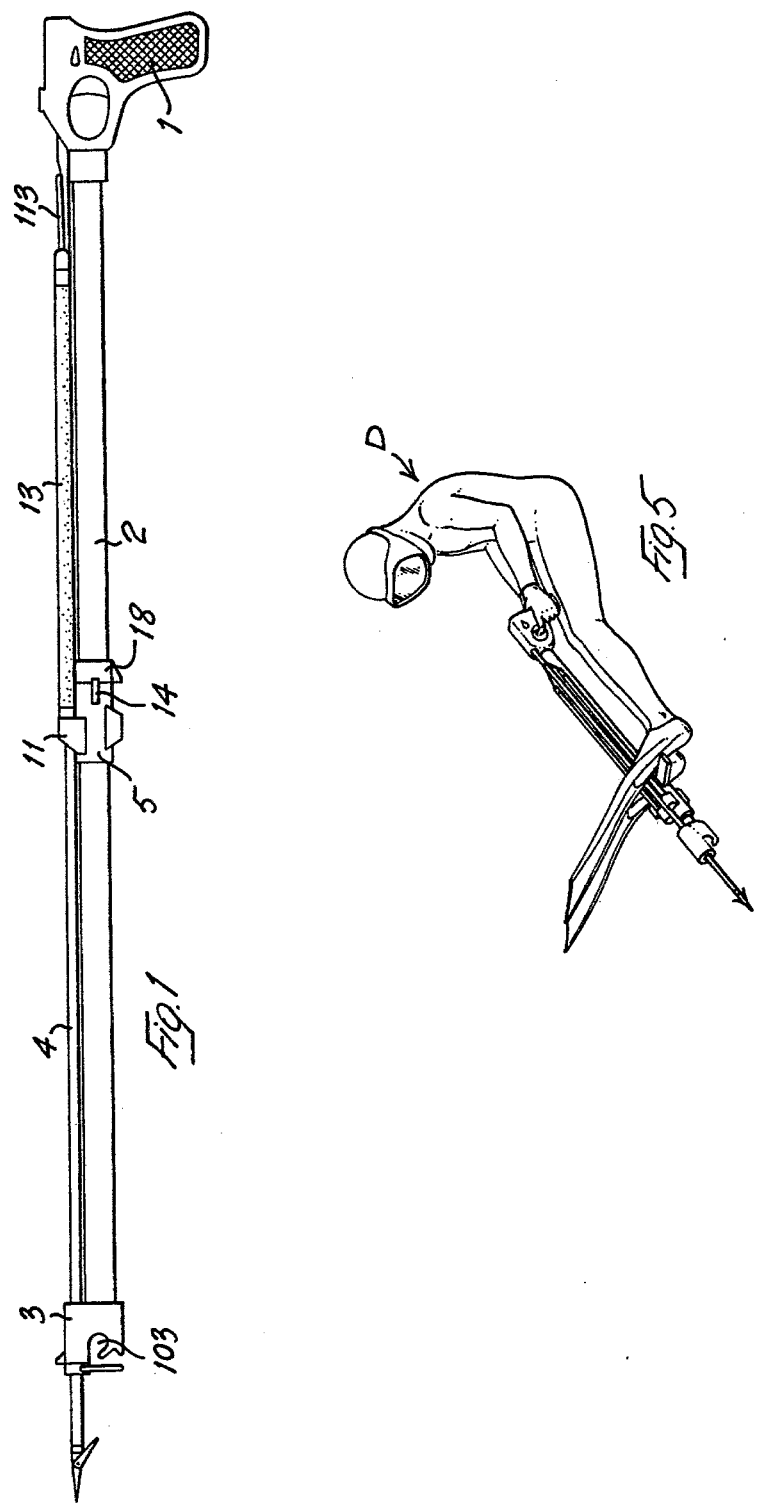

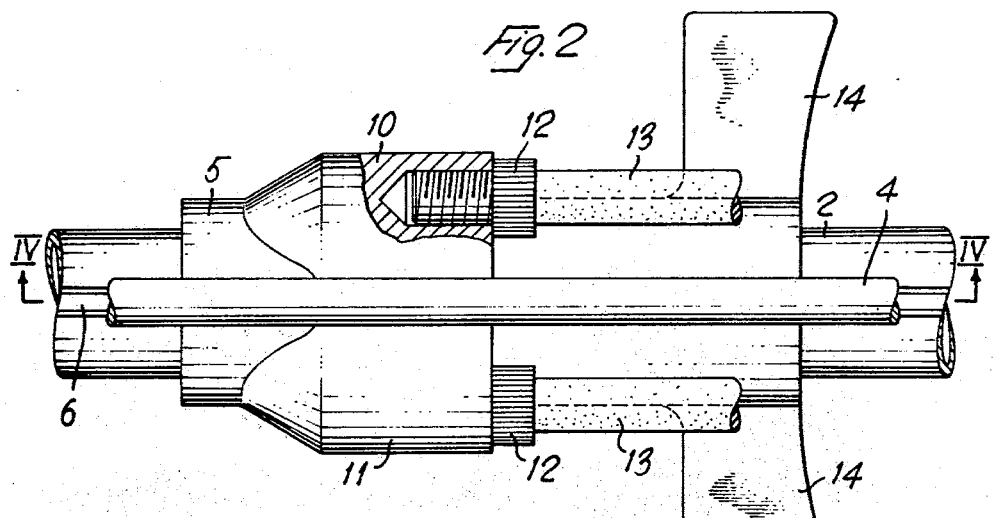
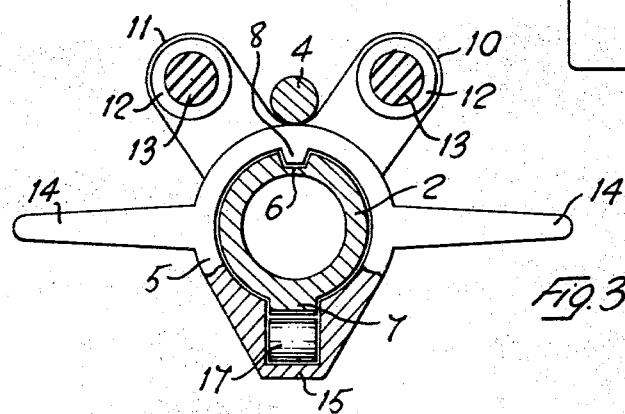
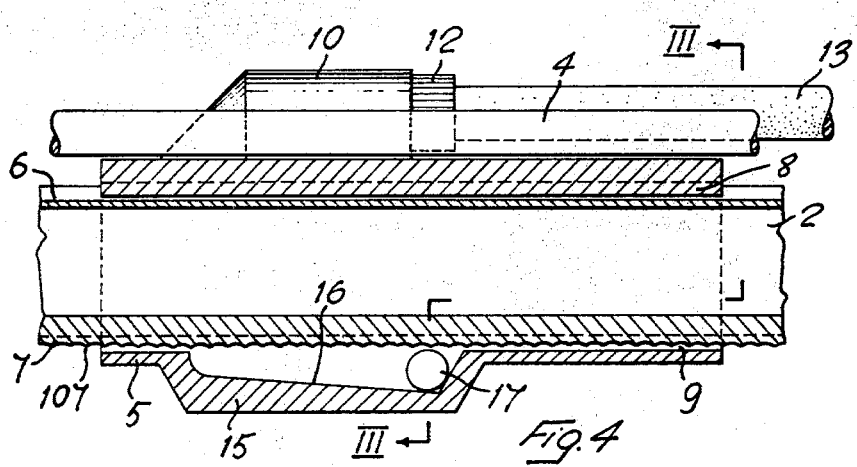

SPEAR GUN

BACKGROUND OF THE INVENTION (1) Field of the Invention

This invention relates to a slingshot type spear or harpoon gun as commonly used for underwater fishing.

(2) Statement of the Prior Art Known

The following prior art is known to the applicant:

U.S. Pat. No. 3,741,190 (LOPEZ)
 Column 1, lines 66–68; column 2, lines 1–68; column 3, lines 1–49; FIGS. 1 to 11.

U.S. Pat. No. 3,006,330 (DE BACH)
 Column 1, lines 40–70; column 2, lines 1–24 FIGS. 1 and 2.

U.S. Pat. No. 3,857,379 (BURGHARDT)
 Column 1, lines 52–67; column 2, lines 1–26 column 3, lines 14–52; FIGS. 1 to 3.

U.S. Pat. No. 2,818,849 (WOODS)
 Column 2, lines 15–72; column 3, lines 1–38 FIGS. 1 to 5.

French Pat. No. 1,240,973 (VALENZA)
 The whole document.

SUMMARY OF THE INVENTION

This invention relates to an improvement in slingshot type spear or harpoon guns, such as those commonly used by skin divers and the like for underwater spear fishing and hunting. Guns of the general type proposed herein are known and consist generally of a central rod, a trigger release mechanism at the rear end, a bracket attached to the forward end of the rod which carries rubber bands and guide means for the arrow to be propelled. In such conventional spear guns, considerable strength is required to cock the gun. The regular manner of cocking the gun is to place the gun stock in the groin and to pull back with both arms on an elastic band that is fitted in a notch in the spear or harpoon. To assist in cocking the gun, the rear end of the gun rod is sometimes provided with a soft packing or the like.

Generally, there is more than one notch in the arrow, so that the user has the choice of half load or full load positions. However, it often occurs that the user is not strong enough to pull the rubber bands back hard enough to fully load the arrow, especially if rubber bands of superior strength are used, in order to provide the required propulsion.

Moreover, the provision of more than one notch on the same arrow is costly, apart from the fact that the arrow would be weakened by a great number of notches.

It is the object of this invention to overcome the disadvantages of the known spear guns of the above mentioned kind, and make the loading of such spear guns very easy and simple, while permitting the gun to be loaded at any desired strength, while at the same time permitting the use of rubber bands of much greater than usual strength.

These and other objects, features and advantages will be apparent from the annexed specification, in which the invention is described with reference to the accompanying drawings.

BRIEF DESCRIPTION OF THE DRAWINGS

FIG. 1 is a side view of a spear gun embodying the present invention.

FIG. 2 is a plan view of a detail of the spear gun of FIG. 1, in enlarged scale.

FIG. 3 is a cross sectional view taken along line III—III of FIG. 4.

FIG. 4 is longitudinal section taken along line IV—IV of FIG. 2, and

FIG. 5 is a perspective view of a diver while loading a spear gun according to the invention.

DESCRIPTION OF THE PREFERRED EMBODIMENT OF THE INVENTION

Referring now more particularly to the drawings, the spear gun according to the invention comprises the rod 2 at one end of which is a pistol grip trigger mechanism 1 having means for receiving and, upon actuation of the trigger, releasing a shaft or arrow 4 having at least one notch (not shown) therein. The rod is provided at its extreme outer end with a head piece 3 having a through hole therein forming another guide means for the arrow 4. The head piece 3 is further provided with a transverse hole 103. All of the mechanism so far described is conventional.

According to the invention, a sleeve 5 (see FIGS. 2 to 4) is carried by rod 2 in a slidable but non-rotatable manner. To this end, the rod 2 is provided at its upper side with a longitudinal groove 6, and at its opposite, lower side with a longitudinal, radially outwardly protruding rib 7, both said groove 6 and said rib 7 extending the entire length of the rod 2. The sleeve 5 is correspondingly provided on its inner mantle with a longitudinal radially outwardly protruding rib 8, cooperating with groove 6, and with a longitudinal groove 9, cooperating with rib 7.

The sleeve 5 carries at its upper side two brackets 10, 11 extending upwardly and radially diverging from one another, provided with threaded bores into which the threaded end nipples 12 of the elastic bands 13 may be screwed. The sleeve 5 is further provided with two laterally radially outwardly extending cross bars 14, and at its lower end with a receptacle 15 communicating with the groove 9, and also a bottom 16 sloping, downwardly from its forward end to its rear end. A roller 17 is housed inside said receptacle 15, and is freely movable from one end to the other thereof. The diameter of the roller 17 is such that, whenever it is disposed at or near the rear end of the receptacle 15, it is out of contact with rib 7 of rod 2, while whenever it rolls near the forward end of the receptacle 15, it bears against both the bottom 16 and the rib 7.

Rib 7 is advantageously provided at its lower side with transverse knurls 107. At an intermediate point of rod 2, an annular abutment member 18 is secured.

OPERATION OF THE DESCRIBED EMBODIMENT

In operation, in order to cock the spear gun, once arrow or spear 4 is inserted in the gun, the sleeve 5 is pulled back along the rod 2, until it abuts against the abutment member 18. In order to allow this sliding back of the sleeve 5, the gun must be inclined upwardly, so that the roller 17 is disposed in the rear portion of the receptacle 15.

Thereafter, a slight pull is exerted on the rubber bands 13, in order to cause a steel yoke 113 connecting the rear ends of the bands 13 to fit into the notch provided in the rear end of the arrow 4.

At this point, the gun is ready to be loaded. To this end, the diver D (FIG. 5), firmly grasping the pistol grip 1 in his hands, bears with the soles of his feet against the cross bars 14, thus pushing the sleeve 5 forwardly along the rod 2. Due to the fact that during this operation the gun is inclined downwardly, the roller 17 will roll toward the forward end of the recess 15, so that, as soon as the push on the sleeve is discontinued, the sleeve will be firmly clamped in the attained position, in opposition to the action of the rubber bands.

It is thus possible to load the gun to any desired degree, and to modify the load force at will.

As noted, the fixed head piece 3 is provided with a through bore or notch 103 at its front end. A single strand conventional rubber band may be inserted in this through bore, so as to permit the gun to be used with a second rubber band set to be cocked in conventional manner should this be required, as for instance in hunting game fish.

I claim:

1. A spear gun comprising
   (a) a rod;
   (b) a sleeve slidably but non-rotatably mounted on said rod;
   (c) guide means for a projectile at the forward end of said rod;
   (d) a hand grip at the rear end of said rod provided with trigger release means for a projectile;
   (e) a resilient means for projecting a projectile;
   (f) means on said sleeve for fastening thereto one end of said resilient means;
   (g) a pair of cross bars extending radially outwardly from said sleeve in a substantially horizontal direction;
   (h) and means for automatically releasably locking said sleeve at any position along said rod, against the action of said resilient means, said locking means comprising
      (i) an elongated recess in said sleeve in communication with said sleeve interior, said recess having a floor inclined downwardly from its forward end to its rear end and essentially in alignment with the longitudinal axis of the gun; and
      (ii) a rollable member within said recess freely movable therein from a rear position in which said member is clear of said rod, to a forward position in which said member is caught between said recess floor and said rod, thereby locking said sleeve to said rod.

2. A spear gun according to claim 1, in which said rod is provided with knurls on its surface cooperating with said locking means.

3. A spear gun according to claim 1, including stop limit abutment means on said rod for limiting rearward movement of said sleeve.

* * * * *